United States Patent
Cittadini et al.

(12)

(10) Patent No.: US 6,190,587 B1
(45) Date of Patent: Feb. 20, 2001

(54) METHOD FOR FORMING PRODUCTS SUCH AS SIMULATED LEATHER OR LIKE PRODUCTS

(75) Inventors: Paolo Cittadini, Luvinate; Giuseppe Luisetti, Laveno Mombello, both of (IT)

(73) Assignee: Industrie Ilpea S.p.A., Malgesso-Varese (IT)

( * ) Notice: Under 35 U.S.C. 154(b), the term of this patent shall be extended for 0 days.

(21) Appl. No.: 09/147,408

(22) PCT Filed: May 2, 1997

(86) PCT No.: PCT/EP97/02327

§ 371 Date: Dec. 18, 1998

§ 102(e) Date: Dec. 18, 1998

(87) PCT Pub. No.: WO97/48537

PCT Pub. Date: Dec. 24, 1997

(30) Foreign Application Priority Data

Jun. 20, 1996 (IT) ................................ MI96A1247

(51) Int. Cl.⁷ ............................ B29C 44/06; B29C 44/12
(52) U.S. Cl. .................. 264/46.5; 264/46.4; 264/46.6; 264/255; 264/257; 264/302
(58) Field of Search ................................ 264/302, 255, 264/46.4, 46.5, 46.6, 257

(56) References Cited

U.S. PATENT DOCUMENTS

| 4,664,864 | * | 5/1987 | Wersosky | 264/302 |
| 4,810,452 | * | 3/1989 | Taillefert et al. | 264/46.4 |
| 5,073,318 | * | 12/1991 | Rohrlach et al. | 264/46.5 |
| 5,234,653 | * | 8/1993 | Buzzoni et al. | 264/255 |
| 5,395,578 | * | 3/1995 | Buzzoni et al. | 264/302 |
| 5,580,501 | * | 12/1996 | Gallagher et al. | 264/46.4 |
| 5,900,196 | * | 5/1999 | Cittadini et al. | 264/46.5 |

* cited by examiner

*Primary Examiner*—Allan R. Kuhns
(74) *Attorney, Agent, or Firm*—Oblon, Spivak, McClelland, Maier & Neustadt, P.C.

(57) ABSTRACT

A method for forming products such as simulated leather including one or more layers from thermoplastic, thermosetting or elastomer materials all formed by slush-moulding, comprising: forming in a slush-moulding mould a first layer of compacted material representing the exposed layer of the finished product, on said first layer forming a second layer of expandable material by further slush-moulding, completing with heat the consolidation of said layers by gelling and expansion of said second layer, the free face of which has an irregular shape. To the layered material thus formed is coupled a support of rigid material without discontinuity points or regions between them by filling every possible interspace.

8 Claims, 3 Drawing Sheets

METHOD FOR FORMING PRODUCTS SUCH AS SIMULATED LEATHER OR LIKE PRODUCTS

The copending patent application PCT/EP 96/01583 (not yet published) of the present applicant describes a method for forming products such as simulated leather or like products with at least one expanded layer from thermoplastic, thermosetting or elastomer materials, comprising the following stages: forming in a slush-moulding mould a first layer of compact material representing the exposed layer of the finished product, on this first layer forming the second layer of expandable material by further slush-moulding, completing with heat the consolidation of the formed layers by gelling and the expansion of said second layer by suitable means to obtain predetermined thicknesses and shapes in said expanded layer, to the layered material formed in this manner there being coupled a support of rigid material possibly filled with reinforcement fibres, said suitable means for obtaining predetermined thicknesses and shapes of said expanded layer consisting either of a counter-mould or of the actual said support of rigid material.

As explained in the said patent application, the finished products obtained by the method in question are generally appropriate for interior trimmings in particular of motor vehicles, for example for parts such as dash panels, consoles, compartment lids and other similar objects for which an appearance as similar as possible to natural leather is required.

As described in the said patent application, the method in question represents considerable progress in particular compared with the preceding method for obtaining such objects produced by thermoforming calendered sheets possibly laminated with an expanded layer.

In this respect, in this preceding method the presence of stretched parts containing congealed forces gives rise to serious shrinking problems with consequent cracking and breakage under hot conditions, especially in that region which in automobiles is exposed to direct sunlight, such as the upper surface of the dash panel.

The inclination of windscreens at increasingly acute angles in accordance with the latest preferred styles has aggravated this problem by causing the temperature to which these interior parts of the vehicle are exposed to often exceed 100° under solar radiation.

The simulated leather obtained by the method of the aforesaid patent application, which essentially uses a slush-moulding method, avoids this defect.

Notwithstanding the substantial progress represented by this patent application, in the practical implementation of the method it has been found that a defect can sometimes arise in the leather produced by it, due substantially to the circumstance that in said stage involving the control of the thickness and shape of the expanded layer, also known as the surface shaping stage for the expanded layer, a uniform and regular surface cannot always be obtained, so that in the next stage involving adhesion to the support, generally by gluing, discontinuity points or regions can arise between the inner surface of the expanded layer and the support itself, which the layer of glue is unable to compensate. This can occur at either cavities or protuberances in the surface of the expanded layer, so that voids or humps are consequently created at the expanded layer/support interface, which are inevitably transmitted to the exposed outer surface of the simulated leather.

This means that the aesthetic effect sought is completely ruined, because those cavities and protuberances transmitted from the interior of the layered structure to the exposed outer surface of the simulated leather are immediately visible.

An analogous defect can occur if, instead of being present on the expanded layer surface, the imperfections are present on the rigid support itself, or on both surfaces.

The object of the present invention is mainly to solve this problem.

The present invention therefore essentially proposes to improve the method described in patent application PCT/EP 96/01583 of the present applicant.

This object, and other advantages which will be apparent from the ensuing description, are attained according to the invention by a method for forming products such as simulated leather or like products with at least one expanded layer from thermoplastic, thermosetting or elastomer materials, comprising the following stages: forming in a slush-moulding mould a first layer of compact material representing the exposed layer of the finished product, on said first layer forming a second layer of expandable material by further slush-moulding, completing with heat the consolidation of said layers by gelling and the expansion of said second layer, to the layered material formed in this manner there being coupled a support of rigid material possibly filled with reinforcement fibres, characterised by comprising a stage involving the filling of every possible interspace between said rigid material support and said expanded second layer.

According to one embodiment of the present invention, said stage involving the filling of every possible interspace between the rigid material support and the expanded second layer consists of coupling the rigid material support to said thus formed layered material by applying a layer of expandable adhesive to their interface.

A suitable expandable adhesive is a bicomponent polyurethane. It is possible in any event to apply a layer of expandable adhesive compatible with the materials to be coupled. The expandable material adhesive can be used either as such or together with suitable adhesion promoters.

In a different embodiment of the method of the present invention, said stage involving the filling of every possible interspace between the rigid material support and said expanded second layer of the layered material consists of coupling to said thus formed layered material the rigid material support possibly filled with reinforcement fibres predispersed in the material or forming a layer to be inserted into the rigid material, this latter being formed by direct moulding onto the free face of said expanded second layer within a suitable mould, for example by casting or by pressure injection moulding so as not to lose the mechanical properties to the expanded layer.

In this embodiment, once formed, the simulated leather is placed in an injection or casting mould, the mould profile reproducing that of the finished product, the rigid support hence being moulded onto the leather in the mould prepared in this manner, to give the finished product.

The thermoplastic, thermosetting or elastomer materials suitable for slush-moulding simulated leather or the like can be chosen from a wide range of resins in powder or liquid form.

The second layer of expandable material comprises expansion agents as azodicarbonamide, sodium bicarbonate, citric acid and others.

Said first layer can be formed of a single color, or of two or more colors for example by using the methods of patents of the present applicant, namely EP 476,742 or WO 94/12331.

For moulding the rigid support, particularly indicated are expanded or non-expanded rigid or semi-rigid thermosetting materials, such as polyurethanes, polyesters, epoxy resins and the like, possibly reinforced with fillers of glass fibres, carbon fibres, polyaramid fibres or fibres with similar characteristics, possibly forming a layer to be inserted into the material.

In that embodiment of the present invention comprising moulding the support directly onto the leather in a mould, particularly indicated are resins liquid at ambient temperature, and hence injectable or castable cold.

BRIEF DESCRIPTION OF THE DRAWINGS

The characteristics and advantages of the invention will be more apparent from the practical examples given hereinafter with reference to the accompanying figures. These examples are not to be considered as limitative.

DETAILED DESCRIPTION OF THE INVENTION

Figure 1:
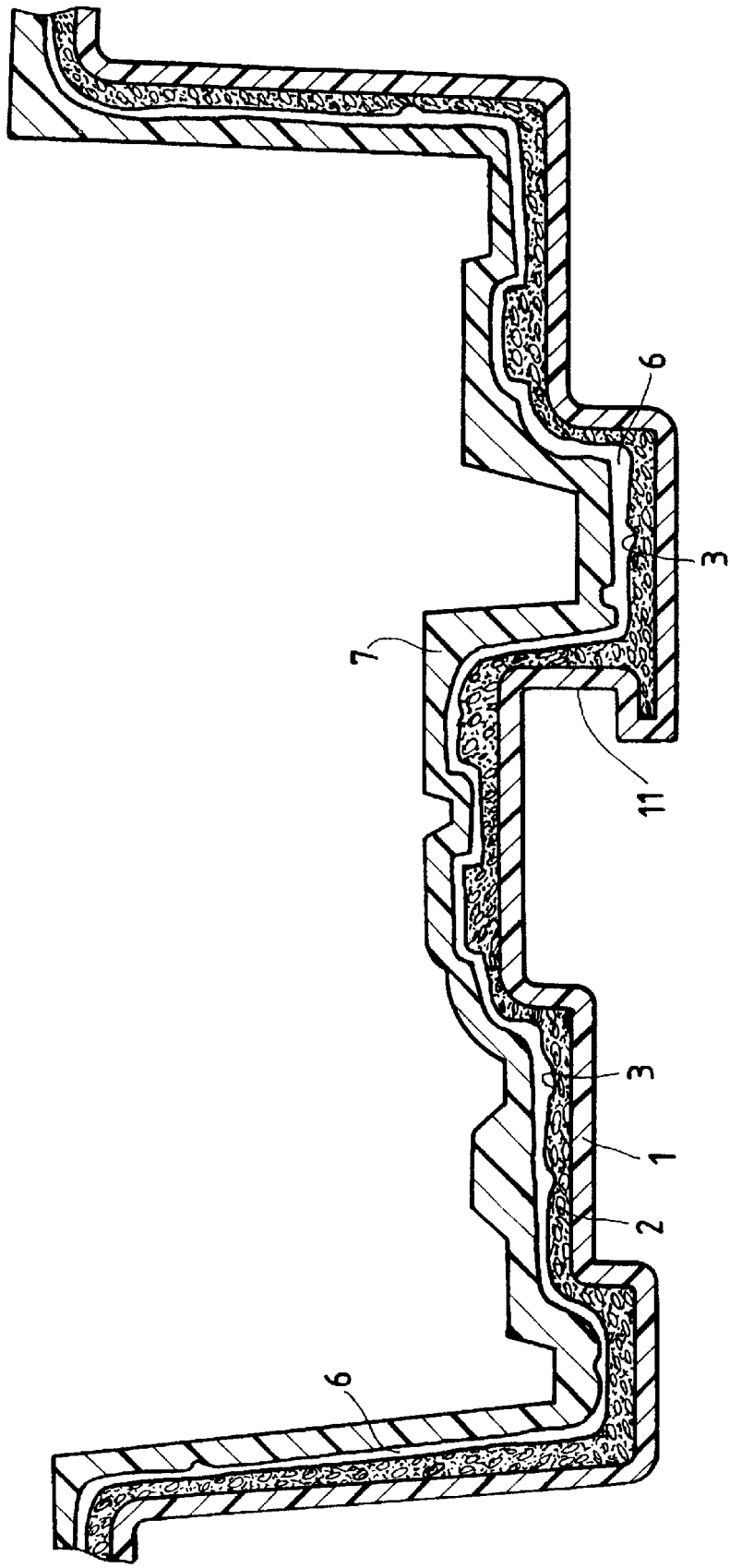
FIG. 1 is a cross-section through coupled materials of a first embodiment of the invention.

FIG. 1 shows a cross-section through a product comprising simulated leather consisting of a first layer 1 of thermoplastic material, for example PVC, and a second layer 2 of expanded material, obtained by slush-moulding expandable PVC.

The simulated leather consisting of the layered structure 1 and 2 is produced for example by the method of the aforesaid patent application PCT/EP96/01583 of the present applicant.

As shown in FIG. 1, the free face of the expanded second layer 2 comprises irregularities, such as concavities 3, due for example to an executional defect in the shaping stage for this face of the expanded layer during its moulding, for example due to irregularities in the profile of the counter-mould used for this shaping.

Finally, in FIG. 1 the reference numeral 7 indicates a rigid support, for example of reinforced thermoplastic or thermosetting material, suitable for coupling to the layered structure 1 and 2 by gluing. The figure also indicates by the reference numeral 6 the interspace between the outer face of the expanded layer 2 and the support 7, in which interspace the glue for fixing the support to the layered structure is deposited.

As can be seen, this interspace is not of regular dimensions, but varies considerably due to the aforesaid circumstance of the irregularities in the outer face of the layer 2.

In the embodiment of FIG. 1, the interspace 6 is filled with an expandable adhesive, for example a bicomponent polyurethane, which when deposited on the interface between the layer 2 and the support 7 begins to expand to fill every possible interspace between said rigid material support and said expanded second layer 2.

The layer of expandable glue is deposited in the interspace 6 by placing the support and the layered structure in a pressing system, for example between a mould and a counter-mould, able to exert the pressure required for gluing and for containing the expansion of the adhesive, so that this effectively fills every minimum interspace between the layer 2 and the support 7 to achieve the required technical effect.

Figure 2:
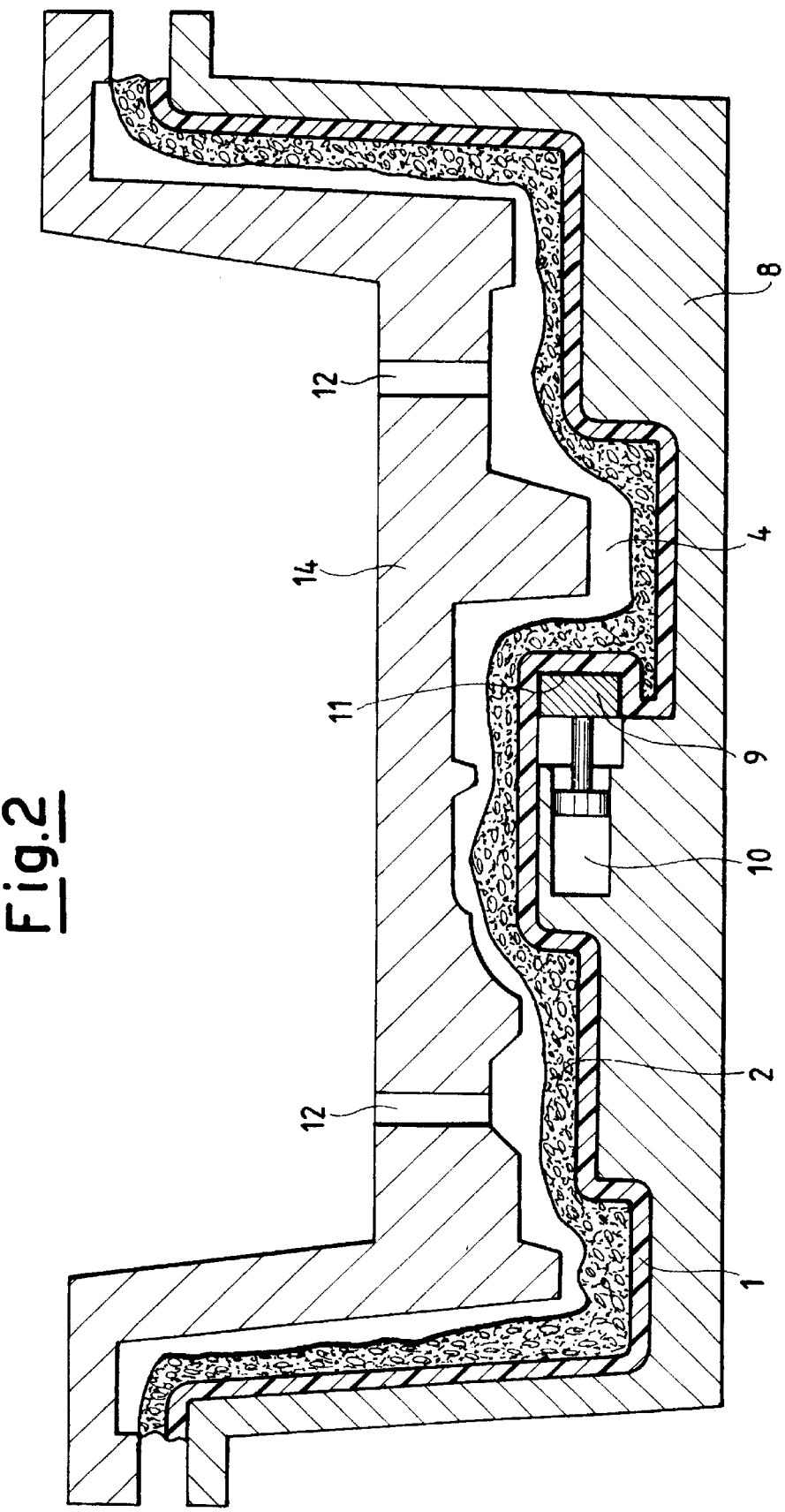
FIG. 2 is a cross-section through a second embodiment of the invention.
Figure 3:
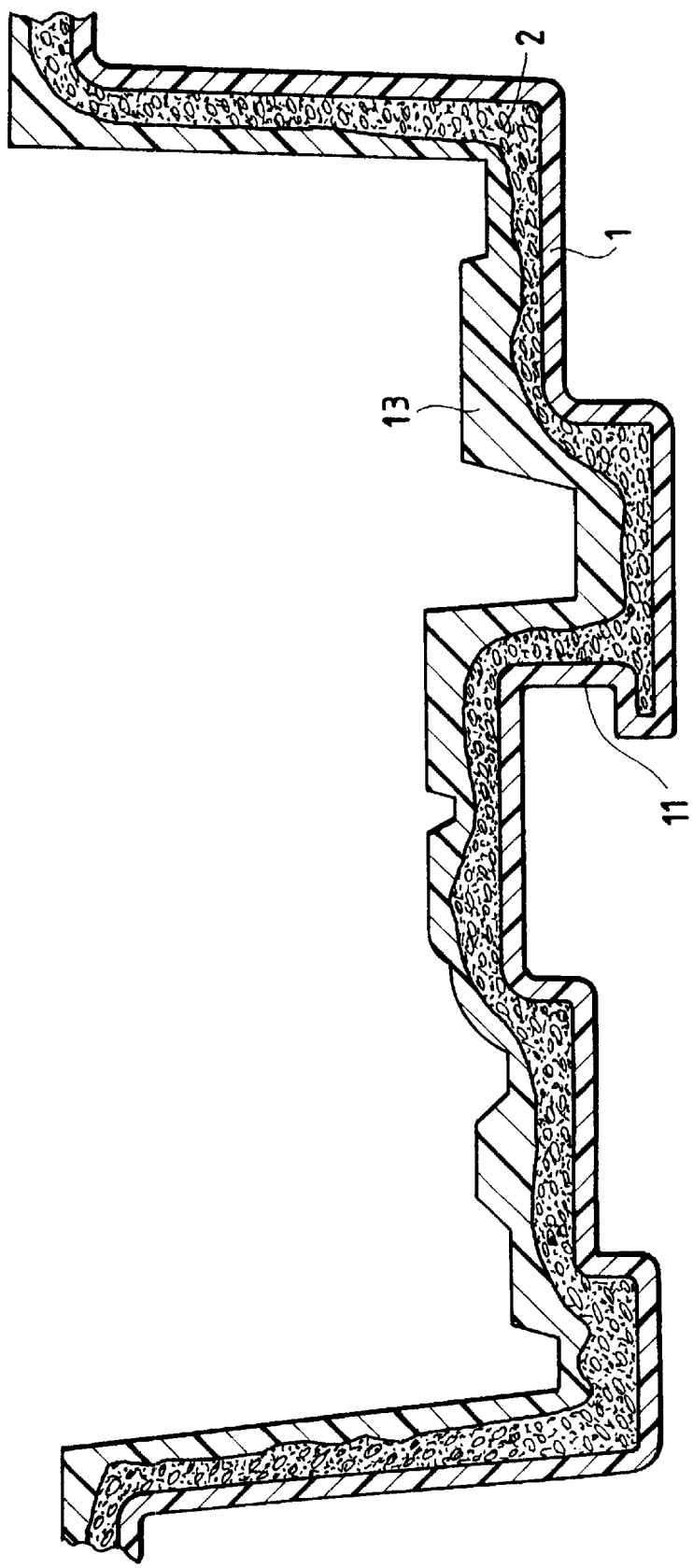
FIG. 3 is a cross-section through the finished product obtained by the method of FIG. 2.

FIGS. 2 and 3 show a different embodiment of the method of the invention, in which the simulated leather consisting of the first layer 1 and the expanded layer 2 has been obtained by a slush-moulding method such as that described in the aforesaid patent application PCT/EP/96/01583, but without any shaping operation on the free face of the expanded second layer 2, ie without providing any means for controlling the thickness and shape thereof.

In this respect, it can be seen from FIGS. 2 and 3 that the free face of the expanded layer 2 is of absolutely irregular shape.

The simulated leather obtained in this manner, consisting of the layered structure 1 and 2, is placed within a mould in the form of two half-moulds 8 and 14.

The half-mould 8 is suitably provided with retractable pressure means, consisting for example of pistons 9 slidable within cylinders 10 particularly suitable for compressing undercuts 11 which are typically present in the layered product. The profile of the half-mould 8 hence corresponds exactly to the profile of the finished product. Devices can be provided in this half-mould to maintain the simulated leather in the correct shape, such as holes for the vacuum etc. In the undercut regions 11 the compression systems consisting of the pistons 9 act, these operationally maintaining the product in shape during moulding in these undercut regions.

In contrast, the half-mould 14 is typically a half-mould provided with channels 12 for injecting the plastic material for forming said rigid support, or for use as a casting mould.

Having closed the mould formed from the two half-moulds 8 and 14, there remains defined between the lower face of the half-mould 14 and the free face of the expanded layer 2 an interspace 4 reproducing the shape of the support to be moulded.

FIG. 2 shows the forming mould for the rigid support in its closed operating position.

Essentially, the procedure comprises initially opening the mould, positioning the layered structure 1 and 2 on the half-mould 8 with the pistons 9 in their rest position, hence retracted within the cylinders 10, and then operating these latter to assume their compression position shown in FIG. 2.

At this point a layer for example of unwoven glass fibre fabric can be located in the interspace 4 remaining between the half-moulds 8 and 14 to reinforce the support to be moulded.

The mould is closed by locating the half-mould 14 in the position shown in FIG. 2. The resin, for example a bicomponent thermosetting resin, is injected or cast, and its cross-linking is awaited.

The pistons 9 are again retracted into the rest position within the cylinders 10, the half-mould 14 is raised and the finished piece is extracted, this being shown in FIG. 3, illustrating the finished product composed of a rigid support 13, an expanded intermediate layer 2 and the exposed outer layer 1.

As can be seen in FIG. 3, again in this case total filling of every possible interspace between the free face of the layer 2 and the rigid support 13 is achieved, this latter in fact being formed by moulding, necessarily following the pattern of the interface with the expanded layer 2.

As stated heretofore, instead of using as reinforcement a layer of suitable material such as unwoven fabric, a resin for injection or cast moulding can be used, containing a strengthening filler.

As is apparent from the aforegoing examples and the description, it is no longer necessary to operate the method described in the aforesaid PCT patent application such as to obtain a regular and uniform free face of the expanded layer, because the method of the present invention in any event results in total filling of every single interspace which can occur between the rigid support and said face of the expanded layer.

If the expanded product does not require its thickness to be predetermined, then compared with the method of said prior PCT patent application, that shaping stage involving adjusting and controlling the shape of the free face of the expanded layer may be omitted.

This does not mean that said stage must not in fact be carried out, but merely that special care need not be taken to achieve perfect uniformity of the free face of the expanded layer.

It could in particular be carried out if the method of the present invention is to use an expandable adhesive.

However it would appear superfluous to effect such a shaping stage if the present invention is implemented by the embodiment comprising moulding the rigid support directly onto the expanded layer, if predetermined thicknesses of the expanded product are not required.

What is claimed is:

1. A method for forming simulated leather products including one or more layers from thermoplastic, thermosetting or elastomer materials all formed by slush-moulding, comprising: forming in a slush-moulding mould a first layer of compacted material representing the exposed layer of the finished product, on said first layer forming a second layer of expandable material by further slush-moulding, completing with heat the consolidation of said layers by gelling and expansion of said second layer the free face of which has an irregular shape, and coupling to the layered material thus formed a support of rigid material which creates discontinuity points or regions between them due to said irregular shape, and filling every possible interspace due to said discontinuity points or regions between said rigid material support and the free face of said expanded second layer.

2. A method as claimed in claim 1, characterised in that said stage involving the filling of every possible interspace between said rigid material support and said expanded second layer consists of coupling said rigid material support to said thus formed layered material by applying an expandable adhesive to their interface.

3. A method as claimed in claim 2, characterised in that said expandable adhesive is a bicomponent polyurethane.

4. A method as claimed in claim 1, characterised in that said rigid material support is formed by casting or injection moulding.

5. A method as claimed in claim 4, characterised in that the rigid support moulding comprises a thermoplastic, thermosetting or elastomer resin reinforced with a filler.

6. A method as claimed in claim 4, characterised in that the rigid support moulding comprises a layer of reinforcement material.

7. A method as claimed in claim 1, characterised in that for rigid support bonding a pair of half-moulds are used, wherein the layered simulated leather is positioned with movable means enabling the leather to be maintained in its correct form, optionally in undercut areas.

8. A method as claimed in claim 1, characterised in that said stage involving completing with heat the consolidation of the formed layers by gelling and the expansion of said second layer is carried out with means for obtaining predetermined thicknesses and shapes of said expanded layer.

* * * * *